(12) United States Patent
Nishioka et al.

(10) Patent No.: US 7,999,036 B2
(45) Date of Patent: Aug. 16, 2011

(54) RUBBER COMPOSITION AND TIRE USING SAME

(75) Inventors: Kazuyuki Nishioka, Kobe (JP); Kazuyoshi Shiga, Kobe (JP); Katsumi Terakawa, Kobe (JP)

(73) Assignee: Sumitomo Rubber Industries, Ltd., Kobe-Shi, Kyogo-Ken (JP)

( * ) Notice: Subject to any disclaimer, the term of this patent is extended or adjusted under 35 U.S.C. 154(b) by 0 days.

(21) Appl. No.: 11/826,477

(22) Filed: Jul. 16, 2007

(65) Prior Publication Data
US 2008/0027176 A1   Jan. 31, 2008

(30) Foreign Application Priority Data

Jul. 26, 2006 (JP) .................................. 2006-203428

(51) Int. Cl.
C08L 75/14 (2006.01)
C08G 18/62 (2006.01)
C08G 18/67 (2006.01)

(52) U.S. Cl. ............................. 525/131; 525/455; 528/75

(58) Field of Classification Search .................... 525/130
See application file for complete search history.

(56) References Cited

U.S. PATENT DOCUMENTS

| | | | | |
|---|---|---|---|---|
| 3,427,366 A * | 2/1969 | Ryan et al. | ...................... | 525/126 |
| 3,637,558 A | 1/1972 | Verdol et al. | | |
| 3,714,110 A | 1/1973 | Verdol et al. | | |
| 3,855,177 A * | 12/1974 | Sanda, Jr. | ....................... | 524/874 |
| 3,897,386 A * | 7/1975 | Sanda, Jr. | ....................... | 525/131 |
| 4,104,265 A * | 8/1978 | deZarauz | ........................ | 525/68 |
| 5,780,573 A * | 7/1998 | Iwata et al. | .................... | 528/272 |
| 6,207,752 B1 * | 3/2001 | Abraham et al. | ................ | 525/67 |
| 6,251,982 B1 * | 6/2001 | Masse et al. | .................... | 524/474 |
| 7,084,207 B2 * | 8/2006 | Yamana et al. | .................. | 525/60 |
| 2007/0232733 A1 * | 10/2007 | Ziser et al. | ..................... | 524/386 |

FOREIGN PATENT DOCUMENTS

| | | |
|---|---|---|
| EP | 1 057 864 A1 | 12/2000 |
| GB | 1150429 A | 4/1969 |
| JP | 45026976 Y1 | 10/1970 |
| JP | 58025338 A | 2/1983 |
| JP | 63-101440 A | 5/1988 |
| JP | 10-273586 A | 10/1998 |
| JP | 2000-319447 A | 11/2000 |
| JP | 2002-80642 A | 3/2002 |
| JP | 2002-542310 A | 12/2002 |
| WO | WO-99/02603 A1 | 1/1999 |
| WO | WO-00/49085 A1 | 8/2000 |
| WO | WO-01/10950 A1 | 2/2001 |
| WO | WO-2007/025690 A1 | 3/2007 |

OTHER PUBLICATIONS

Office Action Dated Nov. 2, 2010, issued in Japanese Application No. JP2007169444.

* cited by examiner

*Primary Examiner* — Randy Gulakowski
*Assistant Examiner* — Mike Dollinger
(74) *Attorney, Agent, or Firm* — Birch, Stewart, Kolasch & Birch, LLP

(57) ABSTRACT

The present invention provides a rubber composition capable of improving grip performance and abrasion resistance and a tire prepared by using the rubber composition. The rubber composition of the present invention comprises 0.5 to 150 parts by weight of thermoplastic polyurethane prepared from a conjugated diene polymer modified with hydroxyl groups at both ends thereof or an aromatic vinyl-conjugated diene copolymer modified with hydroxyl groups at both ends thereof based on 100 parts by weight of a rubber component comprising a diene rubber. The tire of the present invention is prepared by using the rubber composition.

3 Claims, No Drawings

RUBBER COMPOSITION AND TIRE USING SAME

BACKGROUND OF THE INVENTION

The present invention relates to a rubber composition and a tire prepared using the rubber composition.

In recent years, while vehicles have higher performances and more powerful engines, a concern over safety is increasing and a demand for enhanced grip performance of a tire is also increasing. For example, various performances when the vehicles are running at a high speed are required.

Grip performance depends on a hysteresis loss characteristics of a rubber composition. For enhancing grip performance of a rubber composition, a method of increasing amounts of styrene and vinyl in a styrene-butadiene rubber (SBR) and raising a glass transition point is known. However, in this case, the grip performance under low temperature as well as abrasion resistance are reduced, and there is a risk of causing brittle fracture. Another method of improving grip performance by compounding a large amount of oil is also known, however, in such a case, the rubber composition thus prepared possesses deteriorated abrasion resistance due to decrease in destruction resistance property.

A method of using a low molecular weight SBR is also known. However, in such a case, since the low molecular weight SBR still has crosslinkable double bonds, a part of the low molecular weight components forms crosslinking with the matrix rubber and is taken in the matrix and thereby there is a problem that an adequate level of hysteresis loss cannot be obtained.

Furthermore, in JP2000-319447A, a method of using a powder of a specific inorganic compound such as tungsten in a rubber composition is disclosed. Similarly, in JP2002-80642A, a method of using an acrylic resin such as polyacrylic ester particles in a rubber composition is disclosed. However, both of the rubber compositions thus prepared still have a room for further improvement in grip performance.

Further, there is known a rubber composition for a tread comprising polyurethane (urethane particle) in order to improve wet grip performance, abrasion resistance and heat build-up property while maintaining dry grip performance (cf. JP2002-97303A). The polyurethane described in JP2002-97303A comprises a hard segment comprising urethane bonds and a soft segment comprising polyether or polyester. Strength is needed for a rubber composition for a tire comprising a diene rubber. In order to enhance strength of a rubber composition for a tire, further improvements are still required for thermoplastic polyurethane.

An object of the present invention is to provide a rubber composition being capable of enhancing grip performance and abrasion resistance. Another object of the present invention is to provide a tire using the rubber composition.

SUMMARY OF THE INVENTION

The present invention relates to a rubber composition which comprises 0.5 to 150 parts by weight of thermoplastic polyurethane prepared from a conjugated diene polymer modified with hydroxyl groups at both ends thereof or an aromatic vinyl-conjugated diene copolymer modified with hydroxyl groups at both ends thereof based on 100 parts by weight of a rubber component comprising a diene rubber.

It is preferable that the conjugated diene is butadiene or isoprene and the aromatic vinyl is styrene.

A content of hard segment in the thermoplastic polyurethane is preferably 5 to 60% by weight.

The present invention also relates to a tire prepared using the rubber composition.

DETAILED DESCRIPTION

The rubber composition of the present invention comprises a rubber component and thermoplastic polyurethane.

The rubber component comprises a diene rubber.

Examples of the diene rubber are a natural rubber (NR) and a synthetic diene rubber. These diene rubbers are not particularly limited and these may be used alone or two or more kinds thereof may be used in combination.

As for NR, grades commonly utilized in the rubber industry such as RSS#3 and TSR20 can be used.

Examples of the synthetic diene rubber are an isoprene rubber (IR), a butadiene rubber (BR), a styrene-butadiene rubber (SBR), an acrylonitrile-butadiene rubber (NBR), a chloroprene rubber (CR), and a butyl rubber (IIR). These rubber components may be used alone or two or more kinds thereof may be used in combination. From the viewpoint of their capabilities of enhancing grip performance and abrasion resistance in a well balanced manner, BR and SBR are preferable and SBR is more preferable.

The thermoplastic polyurethane used in the present invention is prepared using a polymer modified with hydroxyl groups at both ends thereof and diisocyanate.

The polymer modified with hydroxyl groups at both ends thereof is obtained by modifying both ends of a conjugated diene polymer or an aromatic vinyl-conjugated diene copolymer with hydroxyl groups, and in the present invention they are referred to as a conjugated diene polymer modified with hydroxyl groups at both ends thereof and an aromatic vinyl-conjugated diene copolymer modified with hydroxyl groups at both ends thereof, respectively. If no conjugated diene is contained, compatibility with a rubber is poor, and there is a case where the polyurethane bleeds out and strength at break is deteriorated. The thermoplastic polyurethane used in the present invention contains a conjugated diene component and thus is capable of crosslinking with a rubber by means of sulfur during vulcanization. Therefore, compatibility with the rubber is improved and a decrease in strength at break can be prevented.

The thermoplastic polyurethane used in the present invention comprises a hard segment and a soft segment.

In the present invention, the soft segment is the conjugated diene polymer or the aromatic vinyl-conjugated diene copolymer which constitutes the thermoplastic polyurethane.

In the present invention, the hard segment is a polymer having a urethane bond (—NHCOO—) which constitutes the thermoplastic polyurethane.

First, the soft segment is explained.

The soft segment of the present invention comprises the conjugated diene polymer or the aromatic vinyl-conjugated diene copolymer.

In the aforementioned conjugated diene polymer, examples of a conjugated diene monomer component are 1,3-butadiene, isoprene, 1,3-pentadiene, 2,3-dimethylbutadiene, and 2-phenyl-1,3-butadiene. These may be used alone or two or more kinds thereof may be used in combination. Among them, from the viewpoint of favorable polymerization activity and availability, 1,3-butadiene or isoprene is preferable.

In the aforementioned aromatic vinyl-conjugated diene copolymer, examples of an aromatic vinyl monomer component are aromatic hydrocarbon vinyl monomers such as styrene, alpha-methylstyrene, 1-vinyl naphthalene, 3-vinyl toluene, ethyl vinyl benzene, divinyl benzene, 4-cyclohexylstyrene, and 2,4,6-trimethylstyrene. These may be used alone or two or more kinds thereof may be used in combination. Among them, from the viewpoint of favorable polymerization activity and availability, styrene is preferable.

In the aromatic vinyl-conjugated diene copolymer, the same conjugated diene monomer components as in the case of the aforementioned conjugated diene polymer may be used as the conjugated diene monomer component.

A method of modifying the both ends of the conjugated diene polymer or the aromatic vinyl-conjugated diene copolymer with hydroxyl groups is not especially limited, and, for example, there may be employed a method of reacting a conjugated diene compound or a mixture of a conjugated diene compound and an aromatic vinyl compound in isopropanol in the presence of approximately 40% by weight of a hydrogen peroxide solution under a temperature of approximately 100° C. for approximately 1 hour.

Examples of a method of confirming that the both ends of the conjugated diene polymer or the aromatic vinyl-conjugated diene copolymer have been modified with hydroxyl groups are an infrared spectroscopic analysis (IR), a nuclear magnetic resonance spectroscopic analysis (NMR) and a method of measuring hydroxyl value.

Next, the hard segment is explained.

The hard segment of the present invention comprises a polymer having a urethane bond (—NHCOO—).

In the present invention, diisocyanate is used for forming the hard segment in the thermoplastic polyurethane.

Examples of the diisocyanate that may be used in the present invention are 4,4'-methylene-bis(phenylisocyanate) (MDI), a mixture of isomers of diphenylmethane diisocyanate, toluene diisocyanate, ethylene diisocyanate, paraphenyl diisocyanate, isophorone diisocyanate, 4-4'-methylene-bis(cyclohexylisocyanate), naphthalene diisocyanate, and hexamethylene diisocyanate. Also, a bifunctional isocyanate prepolymer prepared by reacting isocyanate with a bifunctional chain extender, for example, diol of polyether, polyester, caprolactone, and polycarbonate may be used. These may be used alone or two or more kinds thereof may be used in combination. From the viewpoint of favorable reactivity and availability, 4-4'-methylene-bis(phenylisocyanate) is preferable.

A method of preparing the thermoplastic polyurethane used in the present invention is not particularly limited, and a prepolymer method is preferable. According to the prepolymer method, first, an isocyanate group in diisocyanate reacts with a hydroxyl group in the polymer modified with hydroxyl groups at both ends thereof, to form a prepolymer having isocyanate groups at both ends thereof. Then, the isocyanate groups at both ends are reacted with a chain extender to prepare thermoplastic polyurethane. In this case, diisocyanate may be further added during the reaction with the chain extender.

In the present invention, low molecular weight compound having two functional groups can be used as the chain extender.

Examples of the chain extender which can be used in the present invention are primary or secondary alcohols, dicarboxylic acid, mercaptan, and primary or secondary amine. Among these, from the viewpoint of superior reactivity and availability, diol having two hydroxyl groups per molecule is preferable.

Examples of the diol which can be used in the present invention are 1,4-butanediol, 1,3-propanediol, 1,5-pentanediol, 1,6-hexanediol, 1,7-heptanediol, 1,8-octanediol, 1,9-nonanediol, 1-propyl-2-ethyl-1,3-propanediol, 2-methyl-1,3-propanediol, 2-ethyl-1,3-hexanediol (PEPD), 2,2-dimethyl-1,3-pentanediol, 2-butyl-2-ethyl-1,3-propanediol (BEPD), and 2,2,4-trimethyl-1,3-pentanediol (TMPD). Among these, from the viewpoint of favorable reactivity and availability, 1,8-octanediol, 1,4-butanediol, 1,6-hexanediol, 2-butyl-2-ethyl-1,3-propanediol, and 2-ethyl-1,3-hexanediol are preferable.

In the case where the speed of the reaction of the prepolymer is slow, a catalyst may be added.

Examples of the catalyst effective in accelerating the reaction are tertiary amines such as tetramethylbutanediamine, triethylamine, pyridine, and 1,4-diaza[2,2,2]bicyclooctane and organometallic compounds such as tin dioctoate and dibutyltin dilaurate. From the viewpoint of odor of thermoplastic polyurethane to be obtained, the organometallic compounds are preferable, and dibutyltin dilaurate is more preferable.

When a catalyst is used, the content of catalyst is preferably 0.001 to 1.0% by weight based on the weight of the polymer modified with hydroxyl groups at both ends thereof. In the case where the content of catalyst is less than 0.001% by weight, the effect of accelerating the reaction tends to be small. On the contrary, in the case where the content of catalyst is more than 1.0% by weight, urethane bonds formed by the reaction may be destroyed adversely.

A content of the hard segment in the thermoplastic polyurethane is preferably not less than 5% by weight, more preferably not less than 10% by weight. In the case where the content of the hard segments is less than 5% by weight, there is a tendency that a sufficient effect of improving grip performance cannot be obtained. At the same time, the content of the hard segment is preferably not more than 60% by weight, more preferably not more than 50% by weight, particularly preferably not more than 40% by weight. In the case where the content of the hard segment is more than 60% by weight, there is a tendency that the grip performance under low temperature decreases.

The content (% by weight) of the hard segment can be measured by, for example, an infrared spectroscopic analysis (IR) or a nuclear magnetic resonance spectroscopic analysis (NMR).

The thermoplastic polyurethane used in the present invention is characterized by comprising the soft segment comprising the conjugated diene polymer or the aromatic vinyl-conjugated diene copolymer and the hard segment comprising urethane bonds as a polyurethane part.

Namely, the thermoplastic polyurethane used in the present invention comprises the soft segment comprising the conjugated diene polymer or the aromatic vinyl-conjugated diene copolymer and is different from the urethane particle described in JP2002-97303A which comprises soft segment comprising polyether or polyester.

Examples of the thermoplastic polyurethane used in the present invention are (1) a thermoplastic polyurethane (1a) comprising a conjugated diene polymer comprising 1,3-butadiene and 4,4'-methylene-bis(phenylisocyanate) and a thermoplastic polyurethane (1b) obtained by reacting the thermoplastic polyurethane (1a) with 1,8-octanediol as a chain extender, (2) a thermoplastic polyurethane (2a) comprising a conjugated diene polymer comprising isoprene and 4,4'-methylene-bis(phenylisocyanate) and a thermoplastic polyurethane (2b) obtained by reacting the thermoplastic polyurethane (2a) with 1,8-octanediol as a chain extender, (3) a thermoplastic polyurethane (3a) comprising an aromatic vinyl-conjugated diene copolymer comprising styrene and 1,3-butadiene and 4,4'-methylene-bis(phenylisocyanate) and a thermoplastic polyurethane (3b) obtained by reacting the thermoplastic polyurethane (3a) with 1,8-octanediol as a chain extender, and (4) a thermoplastic polyurethane (4a) comprising an aromatic vinyl-conjugated diene copolymer comprising styrene and isoprene and 4,4'-methylene-bis(phenylisocyanate) and a thermoplastic polyurethane (4b) obtained by reacting the thermoplastic polyurethane (4-a) with 1,8-octanediol as a chain extender.

An amount of the thermoplastic polyurethane is not less than 0.5 part by weight, preferably not less than 3 parts by weight based on 100 parts by weight of the rubber component. In the case where the amount of the thermoplastic polyurethane is less than 0.5 part by weight, an improving effect on properties obtained by adding the thermoplastic polyurethane decreases. At the same time, the amount of the thermoplastic polyurethane is not more than 150 parts by weight, preferably not more than 100 parts by weight. In the case where the amount of the thermoplastic polyurethane is more than 150 parts by weight, the rubber strength decreases and the abrasion resistance decreases.

It is preferable that the rubber composition of the present invention further comprises a reinforcing filler. The reinforcing filler may be optionally selected from those which have been commonly used for rubber compositions for tires. Examples of the reinforcing filler are a carbon black, silica, calcium carbonate, aluminum hydroxide, magnesium hydroxide, magnesium oxide, clay, talc, and alumina. These reinforcing fillers may be used alone or two or more kinds thereof may be used in combination. Mainly, a carbon black is preferable.

A nitrogen adsorption specific surface area ($N_2SA$) of the carbon black is preferably not less than 80 $m^2/g$, more preferably not less than 100 $m^2/g$. In the case where $N_2SA$ of the carbon black is less than 80 $m^2/g$, there is a tendency that both of the grip performance and the abrasion resistance decrease. In addition, $N_2SA$ of the carbon black is preferably not more than 280 $m^2/g$, more preferably not more than 200 $m^2/g$. In the case where $N_2SA$ of the carbon black is more than 280 $m^2/g$, favorable dispersibility is hardly obtained and the abrasion resistance tends to decrease.

An amount of the reinforcing filler is preferably not less than 10 parts by weight, more preferably not less than 20 parts by weight based on 100 parts by weight of the rubber component. In the case where the amount of the reinforcing filler is less than 10 parts by weight, the abrasion resistance tends to decrease. At the same time, the amount of the reinforcing filler is preferably not more than 200 parts by weight, more preferably not more than 150 parts by weight. In the case where the amount of the reinforcing filler is more than 200 parts by weight, processability tends to be deteriorated.

Besides the aforementioned rubber component, thermoplastic polyurethane, and reinforcing filler, compounding agents that have been utilized generally in the rubber industry such as anti-aging agents, stearic acid, zinc oxide, a softener such as aromatic oil, an antioxidant, an anti-ozonant, a vulcanizing agent such as sulfur, and various vulcanization accelerators may be optionally compounded in the rubber composition of the present invention according to necessity.

The rubber composition of the present invention is used for a tire. Since both of grip performance and abrasion resistance can be improved, the rubber composition of the present invention is particularly suitable for a tread among various tire members.

The tire of the present invention is prepared by a usual method using the rubber composition of the present invention. More specifically, the rubber composition of the present invention prepared by mixing the aforementioned compounding agents according to necessity is extruded and processed into, for example, a shape of a tread of a tire in an unvulcanized state and then, laminated with other tire members on a tire molding machine and molded in a usual manner to obtain an unvulcanized tire. Then, the unvulcanized tire is subjected to heating and pressurizing in a vulcanizer to obtain the tire of the present invention.

EXAMPLES

Hereinafter, the present invention will be explained in detail based on Examples, but it should be understood that the present invention is not limited thereto.

Various chemicals used in Examples and Comparative Examples will be collectively explained below.

Natural rubber (NR): RSS#3

Styrene-butadiene rubber (SBR): Nipol NS116R available from ZEON Corporation.

Carbon black: SHOWBLACK N220 ($N_2SA$: 125 $m^2/g$) available from CABOT JAPAN Kabushiki Kaisha Antioxidant: NOCRAC 6C (N-1,3-dimethylbutyl-N'-phenyl-p-phenylenediamine) available from Ouchi Shinko Chemical Industrial Co., Ltd.

Stearic acid: Stearic acid available from NOF Corporation.

Zinc oxide: Zinc oxide No. 1 available from Mitsui Mining & Smelting Co., Ltd.

Aromatic oil: JOMO Process X140 available from JAPAN ENERGY CORPORATION

Thermoplastic polyurethane (1) to (8): Prepared in accordance with preparation processes described below.

Sulfur: Sulfur powder available from Tsurumi Chemical Industry Co., Ltd.

Vulcanization accelerator: NOCCELER NS available from Ouchi Shinko Chemical Industrial Co., Ltd.

(Confirmation of Hydroxyl Groups of a Conjugated Diene Polymer Modified with Hydroxyl Groups at Both Ends Thereof)

Absorption at 3,500 to 3,000 $cm^{-1}$ was measured by an infrared spectroscopic analysis (IR) and a peak at $\delta$4 to 4.5 ppm was measured by a proton nuclear magnetic resonance spectroscopic analysis ($^1$H-NMR) to confirm that both ends of conjugated diene polymers or aromatic vinyl-conjugated diene copolymers obtained by the following synthesis methods have been modified with hydroxyl groups.

(Measurement of a Content of Hard Segment of Thermoplastic Polyurethane)

Contents of the respective hard segments of the thermoplastic polyurethanes prepared in the following Preparation Examples (1) to (8) were calculated from integral values of a peak at $\delta$1 to 2 ppm derived from 1,8-octanediol and a peak at $\delta$9 to 10 ppm derived from urethane bonds by a proton nuclear magnetic resonance spectroscopic analysis ($^1$H-NMR).

(Synthesis of a Conjugated Diene Polymer (1) Modified with Hydroxyl Groups at Both Ends Thereof)

Firstly, 5 ml of hexane, 2.1 ml of a t-butyllithium pentane solution with a concentration of 1.7 mol/l, and 0.3 ml of diisopropenyl benzene were mixed and stirred under the condition of 50° C. for 1 hour to prepare a hexane solution. Then, the obtained hexane solution, 50 ml of hexane, 16 ml of butadiene, and 2 ml of tetrahydrofuran were poured in a 100 ml autoclave and stirred under the condition of 50° C. for 1 hour. Then, 0.16 ml of ethylene oxide was added thereto and stirring was continued for another 5 minutes and polymerization was terminated by adding methanol. The product thus obtained was washed with distilled water, and dried using magnesium sulfate, to distill off the solvents, and thus a conjugated diene polymer (1) modified with hydroxyl groups at both ends thereof (polybutadiene modified with hydroxyl groups at both ends thereof) was obtained.

(Synthesis of a Conjugated Diene Polymer (2) Modified with Hydroxyl Groups at Both Ends Thereof)

A conjugated diene polymer (2) modified with hydroxyl groups at both ends thereof (polyisoprene modified with hydroxyl groups at both ends thereof) was obtained in the same manner as in the case of the conjugated diene polymer (1) modified with hydroxyl groups at both ends thereof except that 18.2 ml of isoprene was added instead of 16 ml of butadiene.

(Synthesis of an Aromatic Vinyl-Conjugated Diene Copolymer (1) Modified with Hydroxyl Groups at Both Ends Thereof)

Firstly, 5 ml of hexane, 14 ml of a t-butyllithium hexane solution with a concentration of 1.7 mol/l, and 1.9 ml of diisopropenyl benzene were mixed and stirred under the condition of 50° C. for 1 hour to prepare a hexane solution. Then, the obtained hexane solution, 50 ml of hexane, 2.5 ml of styrene, 12 ml of butadiene, and 2 ml of tetrahydrofuran were poured in a 100 ml autoclave and stirred under the condition of 50° C. for 1 hour. Then, 1.2 ml of ethylene oxide was added thereto and stirring was continued for another 5 minutes and polymerization was terminated by adding methanol. The product thus obtained was washed with distilled water, and dried using magnesium sulfate to distill off the solvents, and thus an aromatic vinyl-conjugated diene copolymer (1) modified with hydroxyl groups at both ends thereof (a polystyrene-butadiene copolymer modified with hydroxyl groups at both ends thereof) was obtained.

(Synthesis of an Aromatic Vinyl-Conjugated Diene Copolymer (2) Modified with Hydroxyl Groups at Both Ends Thereof)

An aromatic vinyl-conjugated diene copolymer (2) modified with hydroxyl groups at both ends thereof (a polystyrene-isoprene copolymer modified with hydroxyl groups at both ends thereof) was obtained in the same manner as in the case of the aromatic vinyl-conjugated diene copolymer (1) modified with hydroxyl groups at both ends thereof except that 14 ml of isoprene was added instead of 12 ml of butadiene.

Preparation Example 1

Preparation of Thermoplastic Polyurethane (1)

100 g of the conjugated diene polymer (1) modified with hydroxyl groups at both ends thereof, 6.5 g of 1,8-octanediol, and 0.05 g of dibutyltin dilaurate were poured in a 250 cc kneader. While the mixture was being stirred under the condition of 150° C., 20.5 g of 4,4'-methylene-bis(phenylisocyanate) (MDI) was added into the kneader and then, stirring was continued for another 30 minutes to prepare thermoplastic polyurethane (1). The content of hard segment of the thermoplastic polyurethane (1) was 21.3% by weight.

Preparation Example 2

Preparation of Thermoplastic Polyurethane (2)

Thermoplastic polyurethane (2) was prepared in the same manner as in Preparation Example 1 except that the conjugated diene polymer (2) modified with hydroxyl groups at both ends thereof was used instead of the conjugated diene polymer (1) modified with hydroxyl groups at both ends thereof. The content of hard segment of the thermoplastic polyurethane (2) was 21.3% by weight.

Preparation Example 3

Preparation of Thermoplastic Polyurethane (3)

Thermoplastic polyurethane (3) was prepared in the same manner as in Preparation Example 1 except that the aromatic vinyl-conjugated diene copolymer (1) modified with hydroxyl groups at both ends thereof was used instead of the conjugated diene polymer (1) modified with hydroxyl groups at both ends thereof. The content of hard segment of the thermoplastic polyurethane (3) was 21.3% by weight.

Preparation Example 4

Preparation of Thermoplastic Polyurethane (4)

Thermoplastic polyurethane (4) was prepared in the same manner as in Preparation Example 1 except that the aromatic vinyl-conjugated diene copolymer (2) modified with hydroxyl groups at both ends thereof was used instead of the conjugated diene polymer (1) modified with hydroxyl groups at both ends thereof. The content of hard segment of the thermoplastic polyurethane (4) was 21.3% by weight.

Preparation Example 5

Preparation of Thermoplastic Polyurethane (5)

Thermoplastic polyurethane (5) was prepared in the same manner as in Preparation Example 1 except that 12.5 g of 1,8-octanediol was added instead of 6.5 g of 1,8-octanediol and also 31 g of MDI was added instead of 20.5 g of MDI. The content of hard segment of the thermoplastic polyurethane (5) was 30.3% by weight.

Preparation Example 6

Preparation of Thermoplastic Polyurethane (6)

Thermoplastic polyurethane (6) was prepared in the same manner as in Preparation Example 1 except that 45 g of 1,8-octanediol was added instead of 6.5 g of 1,8-octanediol and also 90 g of MDI was added instead of 20.5 g of MDI. The content of hard segment of the thermoplastic polyurethane (6) was 57.4% by weight.

Preparation Example 7

Preparation of Thermoplastic Polyurethane (7)

Thermoplastic polyurethane (7) was prepared in the same manner as in Preparation Example 1 except that 0.2 g of 1,8-octanediol was added instead of 6.5 g of 1,8-octanediol and also 9 g of MDI was added instead of 20.5 g of MDI. The content of hard segment of the thermoplastic polyurethane (7) was 8.4% by weight.

Preparation Example 8

Preparation of Thermoplastic Polyurethane (8)

Thermoplastic polyurethane (8) was prepared in the same manner as in Preparation Example 1 except that polyethylene glycol (polyethylene glycol #3000 available from Wako Pure Chemical Industries, Ltd.) was used instead of the conjugated diene polymer (1) modified with hydroxyl groups at both ends thereof. The content of hard segment of the thermoplastic polyurethane (8) was 21.3% by weight.

Examples 1 to 12 and Comparative Examples 1 to 4

In accordance with the compounding prescriptions shown in Tables 1 to 3, compounding chemicals other than sulfur and the vulcanization accelerator were kneaded in a Banbury mixer under the condition of 150° C. for 5 minutes to prepare kneaded products. Then, sulfur and the vulcanization accelerator were added to the obtained kneaded products and were kneaded using an open roll under the condition of 50° C. for 5 minutes to prepare unvulcanized rubber compositions. The obtained unvulcanized rubber compositions were formed into a shape of a tread and were laminated with other tire members on a tire molding machine to prepare unvulcanized tires. Then, each of the unvulcanized tires was press-vulcanized under the condition of 170° C. for 20 minutes to obtain test tires (size: 215/45R17) of Examples 1 to 12 and Comparative Examples 1 to 4. In the following evaluation tests, Comparative Example 1 was selected to be the reference for Examples 1 to 7 and Comparative Examples 1 and 2, Comparative Example 3 was selected to be the reference for Examples 8 to 10 and Comparative Example 3, and Comparative Example 4 was selected to be the reference for Examples 11 to 12 and Comparative Example 4.

(Grip Performance)

The aforementioned tires were mounted on a test car, and the car was run 10 rounds of a test course of asphalt pavement. During the test drive, the test driver implemented sensory evaluations of grip performances of the tires based on a scale of 1 to 5, with 3 being assigned to grip performance of the reference rubber composition (5: good, 4: rather good, 3: average, 2: rather bad, 1: bad). In the evaluation results shown in Tables 1 to 3, grip performance during the first round of a test course of asphalt pavement was represented as initial grip performance, and grip performance during 10 rounds of a test course of asphalt pavement was represented as grip performance during running. The larger the initial grip performance and the grip performance during running are, the better they are.

(Abrasion Resistance)

The aforementioned tires were mounted on a test car and the car was run 20 rounds of the aforementioned test course. Changes in the depth of a groove before and after the run were measured and assuming that the abrasion resistance index of the reference rubber composition is 100, the changes in the depth of a groove of the respective rubber compositions were represented by an index according to the following equation. The larger the abrasion resistance index is, the better the abrasion resistance is.

(Abrasion resistance index)=(change in groove depth of the reference rubber composition)/(change in groove depth of each of the rubber compositions)×100

Evaluation results of the aforementioned tests are shown in Tables 1 to 3.

TABLE 1

| | Ex. | | | | | | | Com. Ex. | |
|---|---|---|---|---|---|---|---|---|---|
| | 1 | 2 | 3 | 4 | 5 | 6 | 7 | 1 | 2 |
| Amounts (part by weight) | | | | | | | | | |
| SBR | 100 | 100 | 100 | 100 | 100 | 100 | 100 | 100 | 100 |
| Carbon black | 50 | 50 | 50 | 50 | 50 | 50 | 50 | 50 | 50 |
| Antioxidant | 1 | 1 | 1 | 1 | 1 | 1 | 1 | 1 | 1 |
| Stearic acid | 2 | 2 | 2 | 2 | 2 | 2 | 2 | 2 | 2 |
| Zinc oxide | 2 | 2 | 2 | 2 | 2 | 2 | 2 | 2 | 2 |
| Aromatic oil | — | — | — | — | — | — | — | 5 | — |
| Thermoplastic polyurethane (1) | 10 | — | — | — | — | — | — | — | — |
| Thermoplastic polyurethane (2) | — | 10 | — | — | — | — | — | — | — |
| Thermoplastic polyurethane (3) | — | — | 10 | — | — | — | — | — | — |
| Thermoplastic polyurethane (4) | — | — | — | 10 | — | — | — | — | — |
| Thermoplastic polyurethane (5) | — | — | — | — | 10 | — | — | — | — |
| Thermoplastic polyurethane (6) | — | — | — | — | — | 10 | — | — | — |
| Thermoplastic polyurethane (7) | — | — | — | — | — | — | 10 | — | — |
| Thermoplastic polyurethane (8) | — | — | — | — | — | — | — | — | 10 |
| Sulfur | 1.5 | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 | 1.5 |
| Evaluation Results | | | | | | | | | |
| Initial grip performance | 4.5 | 4 | 3.5 | 3.5 | 4 | 3 | 5 | 3 | 3 |
| Grip performance during running | 4 | 4 | 4.5 | 4.5 | 5 | 5 | 3.5 | 3 | 4 |
| Abrasion resistance index | 105 | 103 | 108 | 106 | 106 | 101 | 104 | 100 | 85 |

TABLE 2

|  | Ex. | | | Com. Ex. |
| --- | --- | --- | --- | --- |
|  | 8 | 9 | 10 | 3 |
| Amounts (part by weight) | | | | |
| SBR | 100 | 100 | 100 | 100 |
| Carbon black | 50 | 50 | 50 | 50 |
| Antioxidant | 1 | 1 | 1 | 1 |
| Stearic acid | 2 | 2 | 2 | 2 |
| Zinc oxide | 2 | 2 | 2 | 2 |
| Aromatic oil | — | — | — | 50 |
| Thermoplastic polyurethane (1) | 50 | — | — | — |
| Thermoplastic polyurethane (3) | — | 50 | — | — |
| Thermoplastic polyurethane (5) | — | — | 50 | — |
| Sulfur | 1 | 1 | 1 | 1 |
| Vulcanization accelerator | 1.5 | 1.5 | 1.5 | 1.5 |
| Evaluation Results | | | | |
| Initial grip performance | 4 | 3.5 | 4.5 | 3 |
| Grip performance during running | 4.5 | 5 | 5 | 3 |
| Abrasion resistance index | 104 | 110 | 106 | 100 |

TABLE 3

|  | Ex. | | Com. Ex. |
| --- | --- | --- | --- |
|  | 11 | 12 | 4 |
| Amounts (part by weight) | | | |
| NR | 20 | 20 | 20 |
| SBR | 80 | 80 | 80 |
| Carbon black | 50 | 50 | 50 |
| Antioxidant | 1 | 1 | 1 |
| Stearic acid | 2 | 2 | 2 |
| Zinc oxide | 2 | 2 | 2 |
| Aromatic oil | — | — | 10 |
| Thermoplastic polyurethane (2) | 10 | — | — |
| Thermoplastic polyurethane (4) | — | 10 | — |
| Sulfur | 1 | 1 | 1 |
| Vulcanization accelerator | 1.5 | 1.5 | 1.5 |
| Evaluation Results | | | |
| Initial grip performance | 3 | 3.5 | 3 |
| Grip performance during running | 4 | 4.5 | 3 |
| Abrasion resistance index | 103 | 106 | 100 |

The rubber compositions of Comparative Examples 1, 3 and 4 are conventional rubber compositions in which aromatic oil is used as a softener.

In the rubber compositions of Examples 1 to 12 comprising a specified amount of specific thermoplastic polyurethane, both of grip performance and abrasion resistance could be enhanced.

On the other hand, in the rubber composition of Comparative Example 2 comprising thermoplastic polyurethane obtained from polyethylene glycol, an effect of improving grip performance is inadequate and abrasion resistance decreased.

According to the present invention, there can be provided a rubber composition having a capability of enhancing grip performance and abrasion resistance of a tire by compounding a specific rubber component and a specific thermoplastic polyurethane, and a tire prepared by using the rubber composition.

What is claimed is:

1. A tire having a tread comprising a rubber composition, comprising:
   10 to 50 parts by weight of thermoplastic polyurethane based on 100 parts by weight of a rubber component, said thermoplastic polyurethane being prepared from (a) a conjugated diene polymer modified with hydroxyl groups at both ends thereof or (b) an aromatic vinyl-conjugated diene copolymer modified with hydroxyl groups at both ends thereof, wherein the polymer (a) or polymer (b) is reacted with 1,8-octanediol as a chain extender and with 4,4'-methylene-bis(phenylisocyanate),
   and wherein the thermoplastic polyurethane includes (1) a soft segment formed from the polymer (a) or the copolymer (b); and (2) a hard segment formed from the 4,4'-methylene-bis(phenylisocyanate), wherein the content of the hard segment in the thermoplastic polyurethane is 21.3 to 30.3% by weight.

2. The tire of claim 1, wherein the conjugated diene is butadiene or isoprene and the aromatic vinyl-conjugated diene copolymer is styrene.

3. The tire of claim 1, wherein the 1,8-octanediol is reacted with a reaction product of 4,4'-methylene-bis(phenylisocyanate) and said conjugated diene polymer modified with hydroxyl groups or said aromatic vinyl-conjugated diene copolymer.

* * * * *